US005658515A

United States Patent [19]
Lee et al.

[11] Patent Number: 5,658,515
[45] Date of Patent: Aug. 19, 1997

[54] POLYMER MICROMOLD AND FABRICATION PROCESS

[76] Inventors: Abraham P. Lee, 1428 Whitecliff Way, Walnut Creek, Calif. 94596; M. Allen Northrup, 923 Creston Rd., Berkeley, Calif. 94708; Paul E. Ahre, 1299 Gonzaga Ct., Livermore, Calif. 94550; Peter C. Dupuy, 1736 Waldo Ct., Modesto, Calif. 95358

[21] Appl. No.: 533,425

[22] Filed: Sep. 25, 1995

[51] Int. Cl.$^6$ ................................................ B29C 33/40
[52] U.S. Cl. .......................... 264/219; 29/557; 205/70; 249/135; 264/323; 427/135
[58] Field of Search ........................... 264/219, 323; 249/135; 427/135; 205/70; 29/557

[56] References Cited

U.S. PATENT DOCUMENTS 4,381,963   5/1983   Goldstein et al. .................. 264/219 X
5,256,360  10/1993   Li ...................................... 264/219

*Primary Examiner*—Leo B. Tentoni
*Attorney, Agent, or Firm*—L. E. Carnahan; Henry P. Sartorio

[57] ABSTRACT

A mold assembly with micro-sized features in which the hollow portion thereof is fabricated from a sacrificial mandrel which is surface treated and then coated to form an outer shell. The sacrificial mandrel is then selectively etched away leaving the outer shell as the final product. The sacrificial mandrel is fabricated by a precision lathe, for example, so that when removed by etching the inner or hollow area has diameters as small as 10's of micros ($\mu m$). Varying the inside diameter contours of the mold can be accomplished with specified ramping slopes formed on the outer surface of the sacrificial mandrel, with the inside or hollow section being, for example, 275 $\mu m$ in length up to 150 $\mu m$ in diameter within a 6 mm outside diameter (o.d.) mold assembly. The mold assembly itself can serve as a micronozzle or microneedle, and plastic parts, such as microballoons for angioplasty, polymer microparts, and microactuators, etc., may be formed within the mold assembly.

19 Claims, 2 Drawing Sheets

POLYMER MICROMOLD AND FABRICATION PROCESS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to molds, particularly to extrusion molds with micro-sized features, and more particularly to micromolds having inside diameters as small as 10's of microns and to a process for fabricating same.

Molds of various types have been developed over the years to produce numerous different types of objects. Extrusion molding has been widely utilized for the fabrication of products on a commercial level.

Molds with micro-sized features, however, have been extremely difficult to fabricate. Most of the very small molds have utilized clam-shell type devices which have problems with sealing and leakage, particularly when products are being formed from polymers. The prior known micro-sized molds also have non-uniform thermal properties which are critical to the extrusion process.

The present invention overcomes the above-mentioned problems of the prior art micro-sized molds. The micro-sized mold of the present invention, is particularly applicable for polymer extrusion. The mold is fabricated using a sacrificial mandrel by precision machining/electroplating/etching operations which produces a singular, hollow mold assembly that can be tailored to be thermally uniform and has micro-sized feature dimensions.

SUMMARY OF THE INVENTION

It is an object of the present invention to provide a mold having micro-sized features.

A further object of the invention is to provide a process for fabricating micromolds.

A further object of the invention is to provide a micromold for polymer extrusion which has uniform thermal properties.

Another object of the invention is to provide a process for fabricating molds having inside diameters as small as 10's of microns and which can be produced with a wide variety of shapes in micro sizes.

Another object of the invention is to provide a process for fabricating molds, particularly adapted for polymer extrusion, which utilizes a machined sacrificial mandrel on which the mold shell is formed and which is thereafter selectively etched away leaving the outer shell as the final product.

Another object of the invention is to provide a mold with micro-sized features, wherein the mold itself can serve as a micronozzle, for example.

Other objects and advantages of the present invention will become parent from the following description and accompanying drawings. By a combination of precision machining, wire electro-discharge machining (EDM), electroless plating, selective etching, the process for producing a mold having a hollow tubing with an inner contour profile (with diameters on the order of 10's to 100's μm) and an outer diameter (o.d.) of 6 mm is carried out. Using this mold, plastic parts with dimensions less than 100 μm can be extruded. The thus fabricated micromold is produced by an inverted process in which the hollow portion dimensions are fabricated into a sacrificial mandrel by a precision lathe or by wire EDM. The mandrel is then surface treated (to enhance the later selective etching), and then coated by electroplating or electroless plating. The sacrificial mandrel is then selectively etched away leaving the outer shell as the final product, a mold with micro-sized features. The micromold is capable of uniform thermal heating and thus effective for polymer extrusion applications, for example. The micromold may be used, for example, to produce microballoons for angioplasty, polymer microparts, micronozzles, microneedles, microactuators, as well as microballoons for use as laser targets.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to a micromold, particularly for polymer extrusion applications, and to a process for fabricating the micromold. The micromold produced by the process of this invention is a singular, hollow device that can be tailored to be thermally uniform and has micron-sized feature dimensions. The inner contour profile can be formed with diameters on the order of 10's to 100's μm while having an o.d. of 6 mm. The micro-sized features of this mold is accomplished using a sacrificial mandrel which is machined to define the desired contour profile of the mold, then coated to form an outer shell or mold body, and then selectively etched away, leaving a mold in the form of a hollow tube having the desired inner contour profile. Varying inside diameter contours can be fabricated with specified ramping slopes in between by merely machining the outer surface of the sacrificial mandrel. Thus, this invention provides an effective method of producing varies configured extrusion molds for the production of different polymer microparts, balloons, etc.

The micromold of this invention enables the fabrication, for example, of microballoons used for angioplasty to perform interventional catheter-based minimal-invasive surgeries as well as for microactuators. For example, the process has produced a mold used to produce a microballoon 275μm in length and 150 μm in diameter for use in a pneumatic-based microactuation mechanism or microgripper for catheter-based surgical procedures. Microneedles can be fabricated for use in vivo catheter-based microtools. Micronozzles can be produced for use in microinstrumentation for electrophoresis, or for use in fuel injection engines. Various types of polymer microparts can also be produced by a micromold produced by the process of this invention. Thus, many novel interventional procedures can be greatly enhanced by this type of mold, such that a variety of shapes at micro sizes (10's to 100's μm) can be made. The mold itself can serve as a micronozzle or microneedle, with an example of the finished product having an opening of 120 μm within a 6 mm o.d. mold outer shell assembly.

Figure 1:
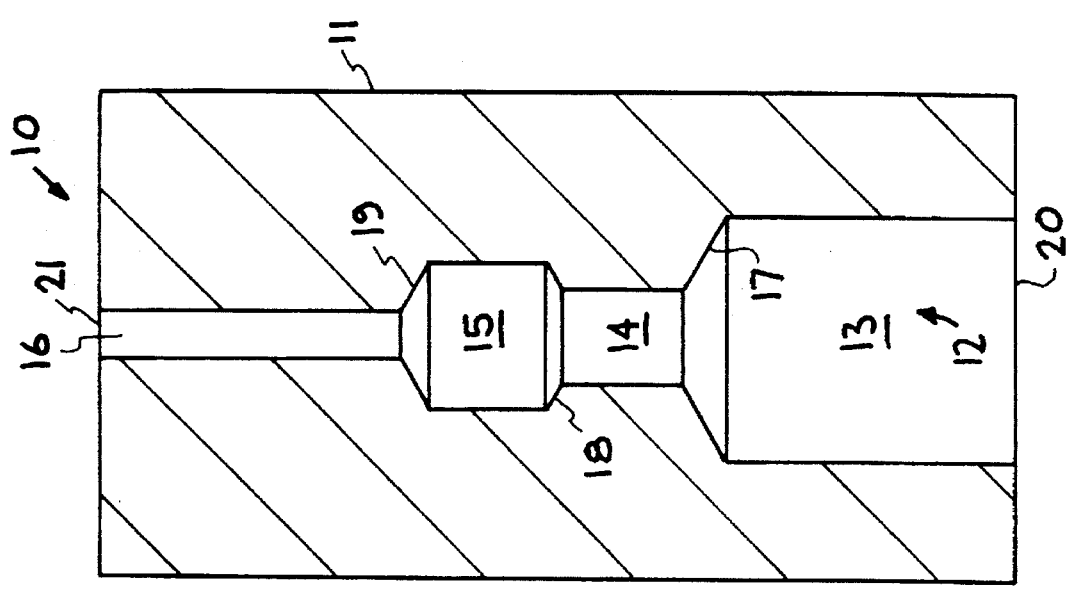
FIG. 1 is a greatly enlarged cross-sectional view of an embodiment of a micromold made in accordance with the present invention.

Referring now to the drawings, FIG. 1 illustrates a micromold, produced by the process described hereinafter with respect to FIGS. 2–4. The FIG. 1 micromold shown in cross-section generally indicated at 10, is constructed of nickel but may be constructed of copper, iron, gold, or platinum or include a gold flash or nickel plate and is composed of a shell 11 having a passageway generally indicated at 12 extending therethrough. Passageway 12 is composed, in this embodiment of four sections 13, 14, 15, and 16 interconnected by tapered or ramping slope sections 17, 18, and 19, and is open at each end 20 and 21. The cross-sections of sections 13–16 in this embodiment are annular, but other configurations may be formed in passageway 12.

By way of example, the shell 11 of micromold 10, which is not shown to scale, has a width of 6 mm and length of ≧3.5 inches (85–90 mm) with the passageway section 13 having a width of 120–800 μm and a length of 4 cm, section 14 having a width of 220 μm and a length of 500 μm, section 15 having a width of 275 μm and a length of 180 μm, and section 16 having a width of 120 μm and length of 250 μm. The tapered or ramping slope section 17 tapers from a width of 800 μm to a width of 220 μm over a distance of 20 μm tapered section 18 tapers from a width of 220 μm to a width of 275 μm over a distance of 10 μm, and tapered section 19 tapers from a width of 275 μm to a width of 120 μmover a distance of 10 μm.

Figure 3:
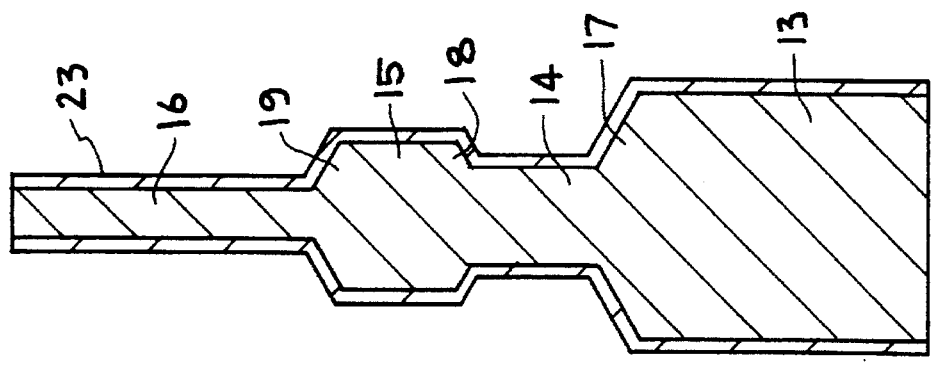
FIGS. 2–4 are cross-sectional views illustrating the fabrication process for the micromold of FIG. 1.
Figure 2:
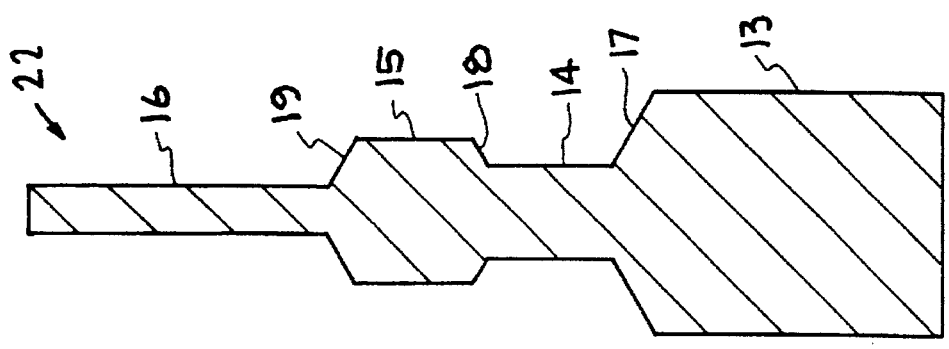
Figure 4:
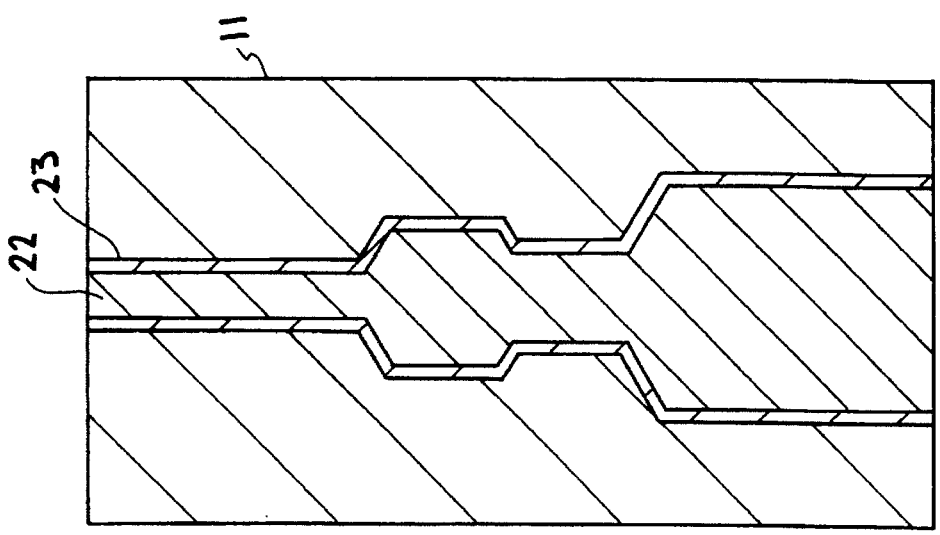

The process for fabricating the micromold 10 of FIG. 1 is an inverted process, as seen in FIGS. 2–4, in which the configuration of passageway 12 through shell 11 is determined by the outer configuration of a sacrificial mandrel 22 (see FIG. 2). The sacrificial mandrel made of copper, for example, is machined by a precision lathe or by wire electro-discharge machining (EDM), to produce the configuration of sections 13–19 of passageway 12 in shell 11, and similar sections on the mandrel are given similar reference numbers. In addition to copper, the sacrificial mandrel 22 may be constructed of brass, aluminum, copper, nickel and other metals that can be selectively etched without damage to the mold material. Mandrel 22 is then surface treated by depositing (such as by flash coating) a thin 5 Å film 23 of gold thereon (see FIG. 3) to enhance the selective etching of the mandrel. Other films such as platinum or materials inert to the etchant of the sacrificial mandrel and having a thickness of 1 to 10 Å, may be utilized in place of gold film 22. The coated sacrificial mandrel is then coated with nickel by electroplating or electroless plating techniques to an overall thickness or outer diameter (o.d.) of 6 mm, for example, to form the shell 11 (see FIG. 4). The o.d. may vary from 1 to 8 mm and is to be proportional to internal dimensions, and the shell 11 can be formed of nickel, copper, gold, platinum, or iron. The composition of the shell 11 must be inert with respect to the materials to be molded therein. After the shell 11 has been deposited on coated mandrel 22, the mandrel 22 is selectively etched away to leave the shell 11 having the desired configured passageway 12 therein, as illustrated in FIG. 1. The etching process is carried out as follows:

The mandrel is selectively etched by using a pulse file vacuum etch apparatus which assures that the etch resultants are removed since the product of the chemical etch is in gas form. The etchant is selected so that it won't attack the mold. As an example, the mandrel is brass, the mold is gold flashed nickel and the etchant is ammonium hydroxide/trichlorine/acetic acid.

The thus formed micromold 10 of FIG. 1 may be utilized for extrusion molding of microparts, microballoons, microneedles, etc., with diameters as small as 10's of μm. Varying diameter contours can be readily accomplished during fabrication of the sacrificial mandrel with specified ramping slopes or tapers in between.

Figure 6:
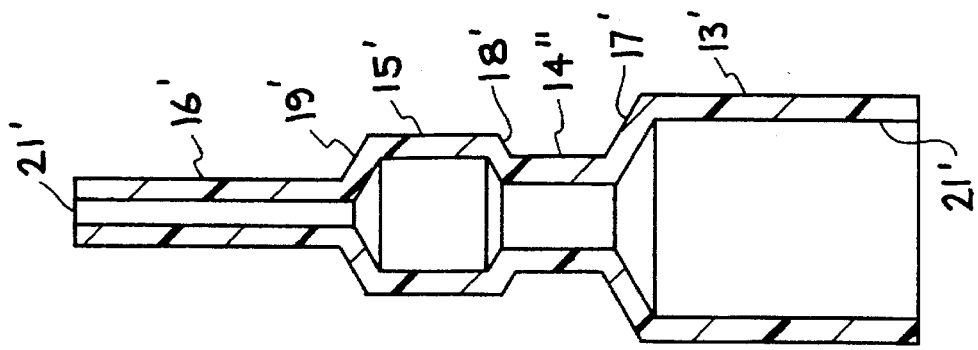
FIG. 6 illustrates in cross-section a microballoon made by polymer extrusion in the micromold of FIG. 5.
Figure 5:
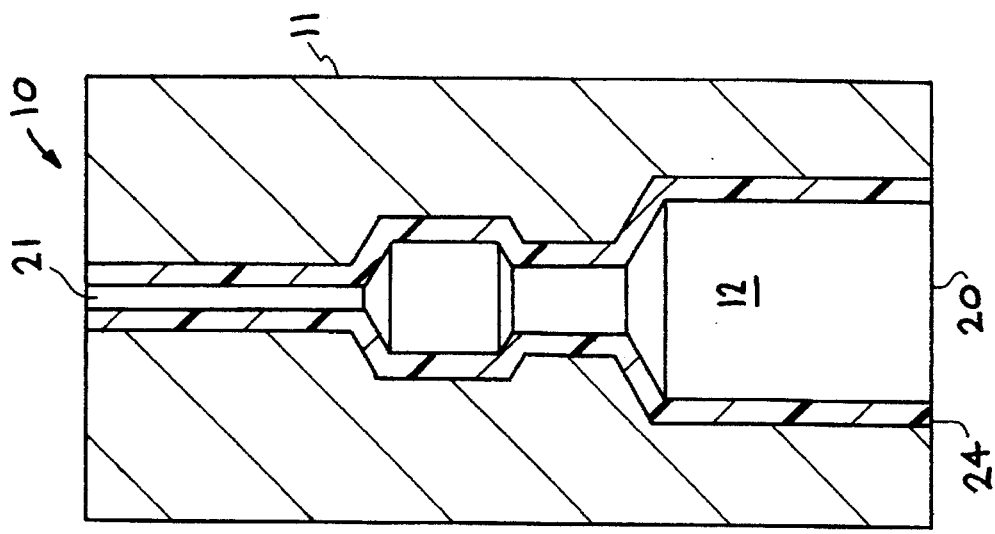
FIG. 5 illustrates the use of the micromold of FIG. 1 for polymer extrusion.

By way of example, the micromold 10 of FIG. 1 may be used for the formation of microballoons using polymer extrusion, as illustrated in FIGS. 5 and 6. As shown, a selected polymer 24 is extruded in passageway 12 of shell 11 to produce the microballoon 25 of FIG. 6. Note that the finished microballoon 25 has the same external configuration as sections 13–19 of the FIG. 1 mold and has been given similar reference numerals; and the ends 20' and 21' of microballoon 25 are similar to the ends 20 and 21 of the micromold 10. Note that ends 20' and 21' of the thus extruded microballoon are open, so that air bubbles can escape during the extruding process, and function to expel trapped gas in the balloon, especially for endovascular applications.

By way of example, the microballoon 25 of FIG. 6 may be composed of polyimide, silicone, nylon, thermoplastic or other extrudable polymers or materials and the extrusion process utilizing the micromold 10 of FIG. 5 is carried out as follows: Thin tubing is forced through the micromold and heated by zone heaters so that the thermoplastic expands and conforms over the inside of the mold. Another method can be used where pressurized inert gas is inserted through the middle of the conforming molten thermoplastic. Uniform heating of the material being extruded is important.

It has thus been shown that the present invention provides molds with micro-sized features without leakage or sealing problems and can be tailored to be thermally uniform, which features are critical to the extrusion process. The micro-machined/electroplating/etching mold fabrication process of this invention, which utilizes as sacrificial mandrel, produces a singular, hollow mold that has micro-sized feature dimensions, which can be readily changed during the mold fabrication process by varying the contours and/or ramping slopes of tapers of the sacrificial mandrel. While the mold is capable of producing various microparts, microballoons, microneedles, etc., the mold itself can serve as a micronozzle or microneedle to direct fluid to a desired location. Parts with dimensions less than 100 μm can be extruded in the micromold.

While a particular embodiment, contours, dimensions, materials, and operational sequence has been described and/or illustrated to exemplify and explain the principles of the invention, such are not intended to be limiting. Modifications and changes may become apparent to those skilled in the art, and it is intended that the invention be limited only by the scope of the appended claims.

The invention claimed is:

1. A method for forming a mold, comprising:
   providing a sacrificial mandrel having a contour on the outer surface,
   depositing at least one layer of material on the outer surface of the sacrificial mandrel to form a shell, and
   removing the sacrificial mandrel, leaving the contour thereof on a passageway within the thus formed shell thereby defining the mold.

2. The method of claim 1, additionally including forming a film on the sacrificial mandrel prior to depositing the shell thereon to enhance removal of the sacrificial mandrel.

3. The method of claim 2, wherein the sacrificial mandrel is removed by etching.

4. The method of claim 3, additionally including forming the sacrificial mandrel from copper, forming the film from gold, and forming the shell from nickel.

5. The method of claim 3, wherein the film is formed by a flash coating process, and wherein the shell is deposited by a process selected from the group consisting of electroplating and electroless plating.

6. The method of claim 1, additionally including forming the contour on the outer surface of the sacrificial mandrel by precision machining.

7. The method of claim 6, wherein said passageway has a contour of various dimensions in different sections thereof by forming the same contour on the outer surface of the sacrificial mandrel, the various being in the range of 10's to 100's μm.

8. The method of claim 7, wherein the shell has a thickness of about 6 mm and wherein passageway has dimensions of about 120μm to about 800μm.

9. The method of claim 6, wherein the contour on the outer surface of the sacrificial mandrel includes a plurality of circular sections interconnected by ramping slopes.

10. The method of claim 1, additionally including utilizing the thus formed mold for polymer extrusion of microsized devices selected from the group consisting of polymer microparts, polymer microballoons, polymer micronozzles, polymer microneedles, and polymer microactuators.

11. A micro-sized device mold, applicable for polymer extrusion therein, comprising:

a shell constructed of material selected from the group consisting of nickel, copper, iron, gold, and platinum;

said shell having a passageway extending therethrough, said passageway having an outer contour configured to define a similar contour on at least an outer surface of a micro-sized device formed therein, said passageway having a plurality of sections therein having a distance thereacross of from 10's to 100's microns.

12. The mold of claim 11, wherein said shell has a width of about 6 mm and length of about 3.5 inches, and wherein said outer contour of said passageway includes a plurality of different diameter sections interconnected by tapering sections.

13. The mold of claim 12, wherein said plurality of different diameter of said passageway have dimensions ranging from about 120 μm to about 800 μm.

14. The mold of claim 11, wherein said shell passageway has an outer diameter and a passageway diameter of a size so as to enable same to be used as a micronozzle.

15. An inverted process for forming a micromold in which a hollow extending therethrough is fabricated from a sacrificial mandrel having an outer surface precision machined to a selected contour of the hollow, the process including:

machining an outer surface of a sacrificial mandrel to a contour of an outer surface of a part to be formed in the micromold, applying a coating of material to the contoured outer surface of the sacrificial mandrel to enhance selective etching of the mandrel, depositing a layer of material on the thus coated sacrificial mandrel to form an outer shell of the micromold, and etching away at least the sacrificial mandrel leaving a micromold defining a hollow extending through the shell having a contour on the surface thereof corresponding to the contour on the outer surface of the sacrificial mandrel.

16. The inverted process of claim 15, additionally including etching away the coating deposited on the sacrificial mandrel from the surface of the passageway.

17. The inverted process of claim 15, wherein the layer of material deposited to form the outer shell of the micromold is deposited by a process selected from the group consisting of electroplating and electroless plating.

18. The inverted process of claim 15, wherein the sacrificial mandrel is formed from copper, aluminum, copper nickel, or brass, wherein the coating is formed from gold, platinum, or other materials inert to an etchant of the sacrificial mandrel; and wherein the outer shell is formed from nickel, copper, iron, gold or platinum.

19. The inverted process of claim 18, wherein the sacrificial mandrel is formed from copper, wherein the coating is formed from gold having a thickness of 1 to 10 Å, wherein the outer shell is formed from nickel having an outer dimension of 1 to 8 mm, and wherein the hollow in the outer shell has sections with dimensions ranging from 10's of microns to 100's of microns.

* * * * *